United States Patent
Payne

(10) Patent No.: US 11,505,055 B2
(45) Date of Patent: Nov. 22, 2022

(54) FLEX PLATE TO DAMPER CONNECTION ON HYBRID POWERTRAIN

(71) Applicant: SCHAEFFLER TECHNOLOGIES AG & CO. KG, Herzogenaurach (DE)

(72) Inventor: Matthew A. Payne, Glenmont, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 292 days.

(21) Appl. No.: 16/870,400

(22) Filed: May 8, 2020

(65) Prior Publication Data

US 2021/0347242 A1 Nov. 11, 2021

(51) Int. Cl.
| | | |
|---|---|---|
| *B60K 6/40* | (2007.10) | |
| *F16H 45/02* | (2006.01) | |
| *F16D 3/12* | (2006.01) | |
| *F16F 15/123* | (2006.01) | |

(52) U.S. Cl.
CPC ............... *B60K 6/40* (2013.01); *F16D 3/12* (2013.01); *F16F 15/123* (2013.01); *F16H 45/02* (2013.01); *B60Y 2200/92* (2013.01); *F16D 2250/0084* (2013.01); *F16F 15/12353* (2013.01); *F16H 2045/0221* (2013.01)

(58) Field of Classification Search
CPC .... B60K 6/40; B60K 6/48; B60K 2006/4825; F16D 3/12; F16D 3/78; F16D 2250/0084; F16F 15/123; F16F 15/12353; F16F 15/13185; F16F 2230/0005; F16F 2230/36; F16H 45/00; F16H 45/02; F16H 2045/0221; F16H 2045/0294; H02K 7/006
See application file for complete search history.

(56) References Cited

U.S. PATENT DOCUMENTS

| | | | | |
|---|---|---|---|---|
| 4,928,486 | A * | 5/1990 | Despres ................... | F16H 45/02 192/214.1 |
| 5,121,821 | A * | 6/1992 | Poorman ............ | F16F 15/13164 464/68.4 |
| 8,739,654 | B2 * | 6/2014 | Himmelreich .... | F16F 15/13107 74/572.2 |
| 2019/0226550 | A1 * | 7/2019 | Weber ................... | F16F 15/145 |

* cited by examiner

*Primary Examiner* — Richard M Lorence

(57) ABSTRACT

An engine damper includes a drive disc having a plurality of studs circumferentially arranged to be received in a flex plate and a driven disc connected to the drive disc by a resilient member. The driven disc defines a plurality of circumferentially arranged first holes arranged in a first pattern. A hub is configured to non-rotatably connect to a shaft. The hub defines a plurality of second holes circumferentially arranged in a second pattern that corresponds to the first pattern. Connectors are disposed in the first and second holes to connect the hub to the driven disc.

20 Claims, 3 Drawing Sheets

… (1)

FLEX PLATE TO DAMPER CONNECTION ON HYBRID POWERTRAIN

TECHNICAL FIELD

The present disclosure relates to hybrid powertrains, and more specifically to embodiments of connecting an engine to an engine damper.

BACKGROUND

Vehicles may include hybrid powertrains to improve fuel economy. A hybrid powertrain includes multiple types of actuators to propel the vehicle. A typical hybrid powertrain includes an internal-combustion engine and at least one electric machine capable of acting as a motor, a generator, or both. The electric machine is powered by a traction battery, such as a lithium-ion battery pack, that includes a plurality of individual cells.

SUMMARY

According to one embodiment, an engine damper includes a drive disc connectable to a flex plate and a driven disc connected to the drive disc by a resilient member. The driven disc defines a plurality of circumferentially arranged first holes arranged in a first pattern. A hub is configured to non-rotatably connect to a shaft. The hub defines a plurality of second holes circumferentially arranged in a second pattern that corresponds to the first pattern. Connectors are disposed in the first and second holes to connect the hub to the driven disc.

According to another embodiment, an engine damper includes a drive disc having a plurality of studs circumferentially arranged to be received in a flex plate and a driven disc connected to the drive disc by a resilient member. The driven disc defines a plurality of circumferentially arranged first holes arranged in a first pattern. A hub is configured to non-rotatably connect to a shaft. The hub defines a plurality of second holes circumferentially arranged in a second pattern that corresponds to the first pattern such that the first holes are aligned with the second holes when the hub and the driven disc are connected. Connectors are disposed in the first and second holes to connect the hub to the driven disc. The drive disc defines access openings arranged to align with the first and second holes to facilitate installation of the connectors.

According to yet another embodiment, a hybrid module includes an electric machine having a shaft with a first end and a second end. A torque converter is operably coupled to the second end of the shaft. A damper is configured to connect an engine to the electric machine. The damper includes a drive disc configured to connect to the engine and a driven disc connected to the drive disc by a resilient member. The driven disc defines a plurality of circumferentially arranged first holes. The damper further includes a hub non-rotatably connected to the first end of the shaft. The hub defines a plurality of second holes circumferentially arranged to align with the first holes. Connectors are disposed in the first and second holes to connect the hub to the driven disc.

According to a further embodiment, a hybrid powertrain includes an engine having a crankshaft and a flex plate. The flex plate is attached to the crankshaft and defines a plurality of circumferentially arranged first holes. An electric machine has a shaft. A damper connects the engine to the electric machine. The damper includes a drive disc having a plurality of studs circumferentially arranged to be received in the first holes to connect the drive disc to the flex plate. The damper further includes a driven disc connected to the drive disc by a resilient member. The driven disc defines a plurality of circumferentially arranged second holes. A hub of the damper is non-rotatably connected to the shaft. The hub defines a plurality of third holes circumferentially arranged to align with the second holes. Connectors are disposed in the second and third holes to connect the hub to the driven disc.

According to another embodiment, a method of assembly includes installing a hub of an engine damper on a shaft of an electric machine. The hub defines a plurality of first holes circumferentially arranged in a first pattern. The method further includes placing a driven disc of the engine damper on the hub such that a plurality of second holes of the driven disc are aligned with the first holes, and inserting connectors through the first and second holes to secure the driven disc to the hub.

DETAILED DESCRIPTION

Figure 1:
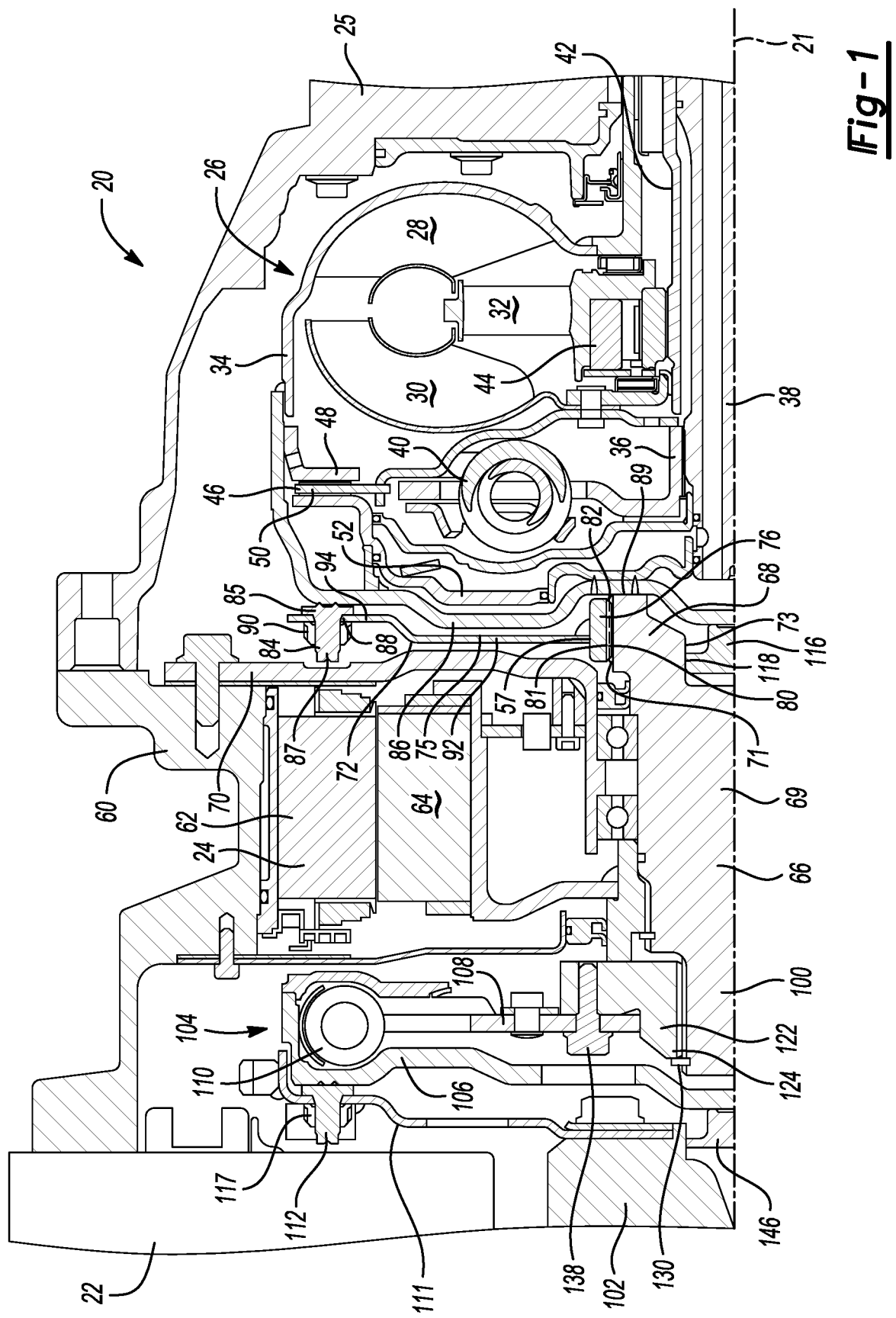
FIG. 1 is a side cross-sectional view of a hybrid powertrain.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis (also known as a centerline) is shown in the figures and described below. Terms such as "outer" and "inner" are relative to the central axis. For example, an "outer" surface means that the surfaces face away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Referring to FIG. 1, a hybrid powertrain 20 includes actuators, e.g., an engine 22 and an electric machine 24, for powering driven wheels (not shown) of a vehicle. The vehicle may be a road vehicle such as a car, sport-utility vehicle, crossover, or pickup truck. The actuators may be coupled to a transmission 25, such as a discrete-ratio, multi-step transmission (commonly referred to as an automatic transmission), by a torque converter 26 or other type of launch device. The transmission 25 may be a continuously variable transmission, a manual transmission, or the like in other embodiments. The powertrain 20 includes a central axis or centerline 21. Many of the rotating components of the powertrain 20, including the engine crankshaft 102, the electric machine 24, and the torque converter 26, are supported for rotation about the central axis 21.

The torque converter 26 is a type of fluid coupling that transfers torque from an input member to an output member hydrodynamically. In one embodiment, the torque converter 26 includes an impeller 28, a turbine 30 adjacent to the impeller, and a stator 32 disposed between the impeller 28 and the turbine 30. The impeller 28 is fixed to a cover 34 of the torque converter 26. The cover 34 is driveably connected to the actuators to receive power as described in detail below. The turbine 30 is connected to a hub 36 that is connected to a turbine shaft 38 such as by a spline connection. The turbine shaft 38 is either the transmission input shaft or is coupled to the transmission input shaft to supply power to the transmission 25. A damper 40 may be interposed between the turbine 30 and the hub 36.

The stator 32 may be coupled to a stator shaft 42 by a one-way clutch 44. The stator shaft 42 is fixed to a front support of the transmission 25 and is stationary relative to the torque converter 26. When the turbine shaft 38 is stationary or rotating slowly compared to cover 34, the one-way clutch 44 holds the stator 32 stationary. Rotation of the impeller 28 forces fluid to move between the impeller 28, the turbine 30, and the stator 32. The fluid exerts a hydrodynamic torque on the turbine 30. The stator 32 provides a reaction force causing the torque on the turbine 30 to be greater than the torque on the impeller 28. When the speed of the turbine 30 approaches that of the impeller 28, fluid tends to flow around the centerline of the torque converter 26 causing the one-way clutch 44 to overrun.

The torque converter 26 may also include a bypass clutch 46 engageable to ground the hub 36 to the front cover 34 to bypass the hydrodynamic torque path through the impeller 28 and the turbine 30. According to one or more embodiments, the bypass clutch 46 may include a clutch plate 48 fixed to the cover 34, a friction disc 50, and a piston 52. The friction disc 50 is connected to the hub 36 via the damper 40. The friction disc 50 is configured to frictionally engage with the clutch plate 48 to lock the hub 36 to the cover 34. The piston 52 is hydraulically actuated by flowing fluid (typically transmission fluid) to a piston chamber to stroke the piston 52. A compensation chamber and/or a spring may be used to return the piston 52 and disengage the bypass clutch 46. The bypass clutch 46 may include a disengaged state, a locked state (fully engaged), and a partially engaged state (slipping). When the bypass clutch 46 is disengaged, power received at the cover 34 is transferred through the hydrodynamic power flow path from the impeller 28 to the turbine 30. When the bypass clutch 46 is locked, power received at the cover 34 is mechanically transferred through the bypass clutch 46. In a slipping state, power received at the cover 34 flows through both the mechanical and the hydrodynamic power flow paths.

The electric machine 24 may act as a motor to power the driven wheels or as a generator to charge a traction battery. The electric machine 24 may include a housing 60, a stator 62, and a rotor 64. The rotor 64 is supported on a rotor shaft 66 and non-rotatably connected thereto. The rotor shaft 66 is connectable to the cover 34 of the torque converter 26. The rotor shaft 66 includes a rear end portion 68 that projects out of a back wall 70 of the housing 60. The rotor shaft 66 may have a varying diameter. For example, the end portion 68 may have a larger diameter than an intermediate portion 69. The end portion 68 includes an outer circumferential surface 71 and defines a pilot bore 73 that is centered on the centerline 21.

The electric machine 24 is driveably connected to the front cover 34. Two components are driveably connected if they are connected by a power flow path that constrains their rotational speeds to be directly proportional. The torque converter 26 includes a connecting assembly used to driveably connect the rotor shaft 66 to the cover 34. The connecting assembly may be fixed to the cover 34 and connect to the rotor shaft 66 via a toothed connection such as a spline connection in which the rotor shaft 66 defines first axially extending teeth and the connecting assembly defines second extending teeth meshing with the first. For example, the shaft end portion 68 may be connected to the torque converter 26 by a drive disc 72, which is one example embodiment of a connecting assembly. The drive disc 72 may be co-axial with the centerline 21. The drive disc 72 may include a plate portion 75 and a hub portion 76. The plate portion 75 may be a circular disc having a hollow center. Formed around the perimeter of the hollow center is an inner circumferential surface 57. The inner circumferential surface 57 is joined to the hub portion 76 such that the plate portion 75 and the hub portion 76 are fixed. For example, the hub portion 76 may be welded to the plate portion 75. The hub portion 76 includes connection features configured to connect the other connection features of the rotor shaft 66 to driveably connect the electric machine 24 and the torque converter 26. The hub portion 76 may be a circular sleeve that defines internal teeth 80, e.g., internal spline teeth, formed on an inner circumferential surface 81 that mate with external teeth 82, e.g., external spline teeth, formed on the surface 71 of the end portion 68.

The cover 34 of the torque converter 26 may be connected to the drive disc 72 by fasteners. The torque-converter cover 34 may include a plurality of studs 84 attached to a front face 86 of the cover 34. The studs 84 may be arranged around the face 86 in a circle or may be radially offset from each other. Each stud 84 may include a head 85 that is welded to the front face 86 and a shank 87 that extends axially forward towards the electric-machine housing 60. The plate portion 75 defines a plurality of holes 88 that are also circumferentially arranged to align with the studs 84. The plate portion 75 is connected to the cover 34 by inserting the studs 84 through the holes 88 and installing retainers, such as nuts 90, on the studs 84. The plate portion 75 may be a stamping such as a stamped steel plate. The plate portion 75 may be formed to conform in shape with the front face 86 of the cover 34. In the illustrated embodiment, the plate portion 75 includes a first radially extending wall 92 and a second radially extending wall 94 that are axially offset from each other.

The above-described torque-converter connection allows for blind assembly of the torque converter 26 to the electric machine 24 as the spline teeth 80 and 82 can be connected without requiring worker access. The torque converter 26 may include a pilot 116 to facilitate centering. The pilot 116 is received within the pilot bore 73 of the rotor shaft 66 to center the torque converter 26. The pilot 116 is attached to the front cover 34 such that it is centered on the centerline 21. The pilot 116 may be attached to the front cover 34 by welding or other attachment method. The pilot 116 may include a cylindrical body with variable diameter along its length. The pilot 116 may include a circumferential pilot surface 118 near a distal end of the pilot 116. The pilot surface 118 is configured to engage with a sidewall of the pilot bore 73 of the rotor shaft 66 to align the torque converter 26 (and the attached transmission) with the housing 60 during assembly. The pilot 116 is circumscribed by the hub portion 76 of the drive disc 72. The diameter of the pilot surface 118 is smaller than the diameter of the inner circumferential surface 81 of the hub portion 76 so that there is a radial gap therebetween. The radial gap allows the rotor shaft 66 to be inserted. The pilot 116 and the hub portion 76 are sized so that the radial gap is substantially equal to a radial distance between the outer circumferential surface 71 and the sidewall of the pilot bore 73. Substantially equal refers to clearance being present to facilitate assembly. For example, the clearance may be between 0.015 to 0.04 millimeters. In an alternative embodiment, the pilot 116 may be a portion of the cover 34 rather than a separate component that is attached to the cover. For example, the cover 34 may be stamped to have an extended nose with a circumferential pilot surface formed near the distal end of the nose. An end face 89 of the rotor shaft 66 engages with the front face 86 of the cover 34 to prevent axial movement of the torque converter 26.

The torque converter connection illustrated in FIG. 1 is but one example embodiment and other connections may be used. For example, Applicant's co-pending application, U.S. application Ser. No. 16/717,050 (filed Dec. 17, 2019), describes other types of connections and is incorporated in its entirety by reference herein.

Figure 2:
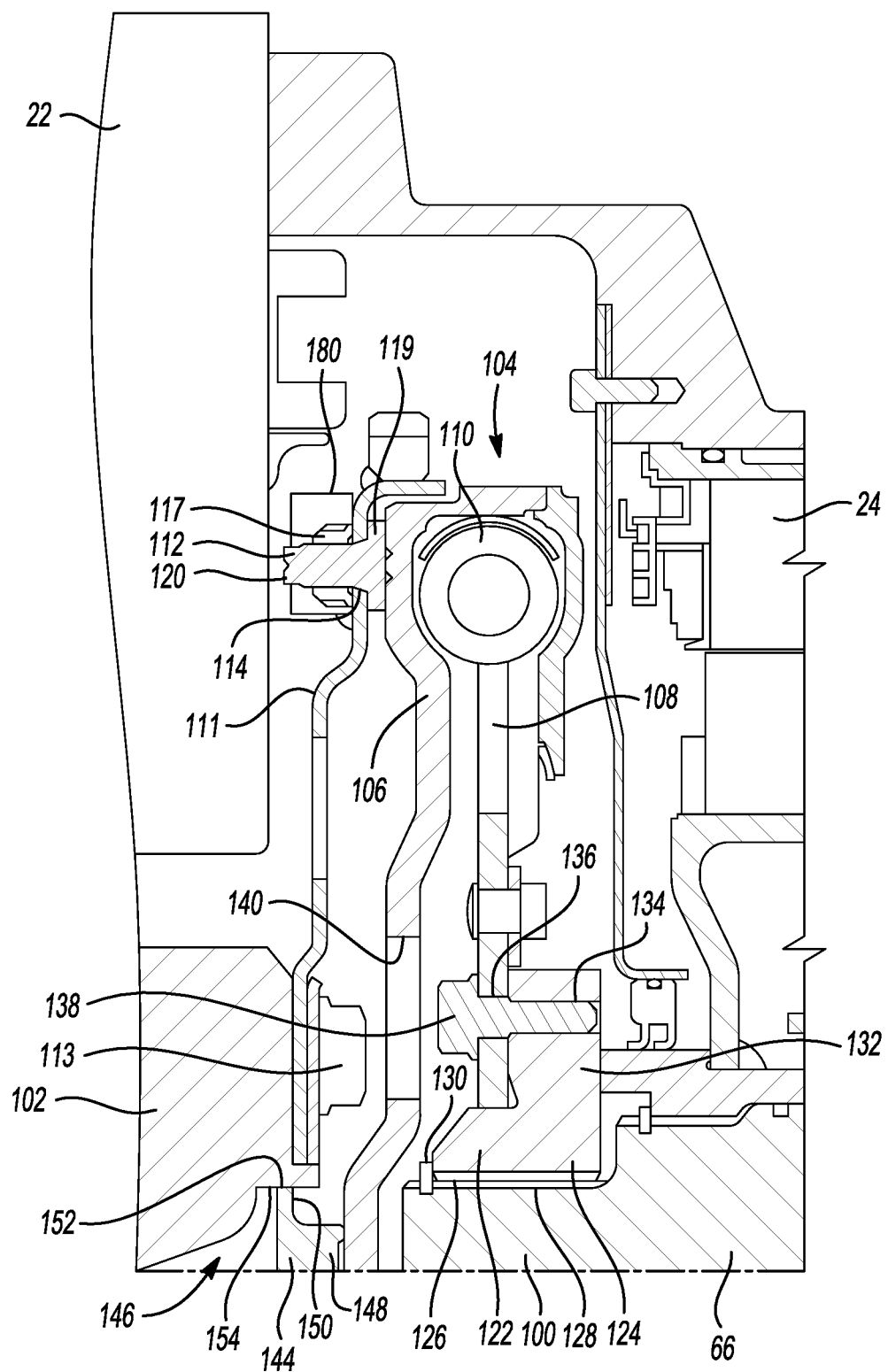
FIG. 2 is a magnified view of a front portion of FIG. 1.

Referring to FIGS. 1 and 2, a front end 100 of the rotor shaft 66 is connected to the engine 22. The crankshaft 102 of the engine 22 may be connected to the rotor shaft 66 by a damper 104. The damper 104 may include a drive disc 106, a driven disc 108, and one or more resilient members 110. The drive disc 106 is connectable to the flex plate 111. For example, the drive disc 106 may include a plurality of studs 112 that project forwardly from a front side of the drive disc 106. The studs 112 may be circumferentially arranged in a pattern that matches a pattern of holes 114 defined in the flex plate 111 so that the studs 112 can be aligned with and inserted through the flex plate 111. Retainers 117 secure the studs 112 to the flex plate 111. In one or more embodiments, the studs 112 are threaded and the retainers 117 are nuts. Each of the studs 112 may include a head 119 that is attached to the drive disc 106, such as by welding or the like, and a shank 120 that is received through the holes 114 of the flex plate 111.

Torque from engine 22 enters the system via the crankshaft 102. The crankshaft 102 is connected to the flex plate 111 for torque transmission therebetween. For example, the crankshaft 102 may be connected to flex plate 111 via bolts 113 or other type of connection. The flex plate 111 transmits torque produced at the crankshaft 102 to the studs 112 and subsequently to the drive disc 106 of damper 104.

The drive disc 106 receives power from the engine 22 and that power is transmitted to the driven disc 108 through the one or more resilient members 110. The resilient members 110 may be one or more arc springs that transmit torque from the drive disc 106 to the driven disc 108 while also damping vibrations, power pluses, and the like. The driven disc 108 is connected to the shaft 66 via a hub 122. The hub 122 includes a sleeve portion 124 configured to non-rotatably connected to the shaft 66, i.e., the sleeve portion 124 and the shaft 66 rotate in unison. For example, the sleeve portion 124 defines an internal spline 126 that mates with an external spline 128 of the shaft 66. A snap ring 130 may be provided on the shaft 66 for axial retention of hub 122 on shaft 66, i.e., to prevent the hub 122 from sliding off the end of the shaft 66. The shaft 66 may define a groove that receives the snap ring 130. The hub 122 also includes a flange portion 132 that defines holes 134. The holes are circumferentially arranged around the flange portion 132. The driven disc 108 also defines holes 136 that are circumferentially arranged in a pattern to match the pattern of the holes 134. During assembly, the holes 134 and 136 are rotated into alignment so that connectors 138 can be inserted through the holes to connect the driven disc 108 to the hub 122. The connectors 138 may be a fastener, such as a threaded fastener, that threadably engages with threads defined in the hole 134. In the illustrated embodiment, the holes 136 may be referred to as through holes (smooth sidewall) and the holes 134 may be referred to as tapped holes.

To facilitate assembly, the drive disc 106 may define a plurality of access openings 140 that are circumferentially arranged in a pattern that matches, and aligns with, the holes 134 and 136. The access openings 140 are sized to allow a tool to engage with the connector 138 to connect the driven disc 108 to the hub 122. The access openings 140 may be larger than the holes 134, 136, e.g., a diameter of the openings 140 may be larger than the diameter of a head of the connectors 138. Likewise, the diameter of the openings 140 may be larger than a diameter of holes 134, 136. The access openings 140 may be circular, ovular, square, or any other shape that permits a tool to engage with the connectors 138.

The damper 104 may include a piloting feature that centers the damper 104 to the crankshaft 102. The piloting feature may include a pilot 144 that is attached to the front of the drive disc 106 and projects forward to be received within a central bore 146 of the crankshaft 102. The pilot 144 may include a base 148 attached to the drive disc 106, such as by welding or the like, and a head 150 that is disposed within the central bore 146. The head 150 defines an outer circumferential pilot surface 152 configured to engage with an inner circumferential surface 154 of the crankshaft 102. The above-described damper 104 increases ease of assembly.

Methods may be represented by flow charts or similar diagrams in one or more figures. These figures provide representative methods or processes that may be implemented to manufacture, at least partially, the above-described apparatuses. The various steps illustrated may be performed in the sequence illustrated, in parallel, in a different sequence, or in some cases omitted. Although not always explicitly illustrated, one of ordinary skill in the art will recognize that one or more of the illustrated steps may be repeatedly performed depending upon the particular process.

Figure 3:
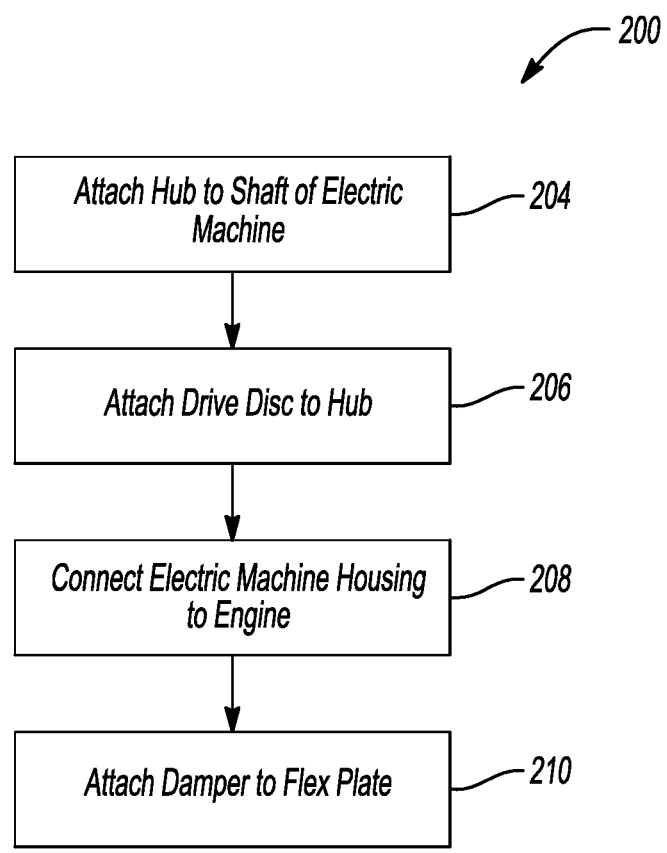
FIG. 3 is a flow chart of a method for assembling the hybrid powertrain.

FIG. 3 is one example method 200 of assembly for connecting the engine 22, the electric machine 24, and the damper 104. The above-described apparatus is not limited to this example method of assembly, and the method is not limited to the above-described apparatus. For ease of description, the method 200 will be described in conjunction with the illustrated embodiment, however, the method 200 is not limited thereto.

Referring to FIG. 3, the method 200 starts with the engine 22 and the electric machine 24 still disassembled. Generally, the damper 104 is installed onto rotor shaft 66 of the electric machine 24 and then the electric machine 24 with the damper 104 is attached to the engine 22. At operation 204, the hub 122 is attached to the shaft 66 of the electric machine 24. The hub 122 may be attached by aligning the splines and sliding the hub 122 onto the shaft 66. Once installed, the snap ring 130 is connected to prevent the hub 122 from sliding off the end of the shaft 66. At operation 206, the remaining portions of the damper 104 are connected to the hub 122. For example, the driven disc 108 is seated on the hub 122 and rotated so that the holes 134 and 136 are aligned. The connectors 138, e.g., threaded fasteners, are installed through the holes 134, 136 to connect the driven disc 108 to the hub 122. The access openings 140 in the drive disc 106 provide clearance for installing the connectors 138. The damper 104 is now fully attached to the electric machine 24 and the electric machine 24 can now be connected to the engine 22 at operation 208. The electric machine 24 is connected to the engine 22 by centering the shaft 66 with the crankshaft 102. The pilot feature of the damper 104 facilitates this. To properly connect, the studs 112 of the damper 104 are aligned with the holes 114 of the flex plate so that the studs 112 can be inserted through the holes. Bolts (not shown) may be used to secure the electric-machine housing 60 to the engine 22. At operation 210, nuts 117, or similar components, are installed on the studs 112 to secure the drive disc 106 to the flex plate 111. The housing 60 may include access ports 180 to facilitate attachment of the nuts 117.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST hybrid powertrain 20
powertrain 20
central axis 21
engine 22
electric machine 24
transmission 25
torque converter 26
impeller 28
turbine 30
stator 32
front cover 34
hub 36
turbine shaft 38
damper 40
stator shaft 42
one-way clutch 44
bypass clutch 46
clutch plate 48
friction disc 50
piston 52
inner circumferential surface 57
housing 60
stator 62
rotor 64
shaft 66
shaft end portion 68
intermediate portion 69
back wall 70
outer circumferential surface 71
drive disc 72
pilot bore 73
plate portion 75
hub portion 76
spline teeth 80
inner circumferential surface 81
external teeth 82
studs 84
head 85
front face 86
shank 87
holes 88
end face 89
nuts 90
first radially extending wall 92
second radially extending wall 94
front end 100
crankshaft 102
damper 104
drive disc 106
driven disc 108
resilient members 110
flex plate 111
studs 112
holes 114
pilot 116
retainers 117
pilot surface 118
head 119
shank 120
hub 122
sleeve portion 124
internal spline 126
external spline 128
snap ring 130
flange portion 132
holes 134
holes 136
connectors 138
access openings 140
pilot 144
central bore 146
base 148
head 150
outer circumferential pilot surface 152 inner circumferential surface 154
access ports 180

What is claimed is:

1. An engine damper comprising:
a drive disc connectable to a flex plate;
a driven disc connected to the drive disc by a resilient member, the driven disc defining a plurality of first holes circumferentially arranged in a first pattern;
a hub configured to non-rotatably connect to a shaft, the hub defining a plurality of second holes circumferentially arranged in a second pattern that corresponds to the first pattern such that the first holes are aligned with the second holes when the hub and the driven disc are connected; and
connectors disposed in the first and second holes to connect the hub to the driven disc;
wherein the drive disc defines a plurality of third holes circumferentially arranged in a third pattern that corresponds to the first pattern.

2. The engine damper of claim 1, wherein the connectors are threaded fasteners.

3. The engine damper of claim 2, wherein the second holes are threaded.

4. The engine damper of claim 2, wherein the threaded fasteners include heads, and the diameters of the third holes are larger than diameters of the heads.

5. The engine damper of claim 1, wherein diameters of the third holes are larger than diameters of the first holes.

6. The engine damper of claim 1 further comprising a pilot projecting from the drive disc and configured to engage with a crankshaft of an engine to center the engine damper.

7. The engine damper of claim 6, wherein the pilot includes a base attached to the drive disc and a head defining an outer circumferential pilot surface configured to engage with the crankshaft.

8. The engine damper of claim 1, wherein the drive disc, the driven disc, and the hub are supported for rotation about a common axis.

9. The engine damper of claim 1, wherein the hub has a sleeve portion defining an internal spline and a flange portion extending radially outward from the sleeve portion and defining the second holes.

10. The engine damper of claim 1, wherein the drive disc has a plurality of studs circumferentially arranged and configured to be received in the flex plate.

11. The engine damper of claim 10, wherein the studs each include a head connected to the drive disc and a threaded shank.

12. A hybrid module comprising:
an electric machine including a shaft having a first end and a second end;
a torque converter operably coupled to the second end of the shaft; and
a damper configured to connect an engine to the electric machine, the damper including:
a drive disc configured to connect to the engine,
a driven disc connected to the drive disc by a resilient member, the driven disc defining a plurality of circumferentially arranged first holes,
a hub non-rotatably connected to the first end of the shaft, the hub defining a plurality of second holes circumferentially arranged to align with the first holes, and
connectors disposed in the first and second holes to connect the hub to the driven disc.

13. The hybrid module of claim 12, wherein the drive disc defines a plurality of third holes circumferentially arranged in a pattern that matches the pattern of the first holes, and wherein diameters of the third holes are larger than diameters of the first holes.

14. The hybrid module of claim 12, wherein the damper further includes a pilot projecting from the drive disc and configured to engage with a crankshaft of the engine to center the damper.

15. The hybrid module of claim 12 further comprising a connecting assembly configured to connect the torque converter to the shaft, the connecting assembly including a hub portion slidably connected to the second end of the shaft and a plate portion connected to the torque converter.

16. The hybrid module of claim 12 further comprising an annular retainer connected to the first end of the shaft and disposed between the hub and the drive disc.

17. A method of assembling an engine damper to an electric machine, the method comprising:
installing a hub of an engine damper on a shaft of an electric machine, wherein the hub defines a plurality of first holes circumferentially arranged in a first pattern;
placing a driven disc of the engine damper on the hub such that a plurality of second holes of the driven disc are aligned with the first holes; and
inserting connectors through the first and second holes to secure the driven disc to the hub.

18. The method of claim 17 further comprising:
prior to the placing of the driven disc, connecting an annular retainer to the shaft to axially secure the hub on the shaft.

19. An engine damper comprising:
a drive disc connectable to a flex plate;
a driven disc connected to the drive disc by a resilient member, the driven disc defining a plurality of first holes circumferentially arranged in a first pattern;
a hub configured to non-rotatably connect to a shaft, the hub defining a plurality of second holes circumferentially arranged in a second pattern that corresponds to the first pattern such that the first holes are aligned with the second holes when the hub and the driven disc are connected;
connectors disposed in the first and second holes to connect the hub to the driven disc; and
a pilot projecting from the drive disc and configured to engage with a crankshaft of an engine to center the engine damper.

20. The engine damper of claim 19, wherein the drive disc is connected to the flex plate by a plurality of studs, and the studs each include a head connected to the drive disc and a threaded shank.

* * * * *